US007317263B2

(12) United States Patent
Anderson

(10) Patent No.: US 7,317,263 B2
(45) Date of Patent: Jan. 8, 2008

(54) POWER TOOL LOCKDOWN DEVICE

(76) Inventor: Gary Anderson, 5401 Fleming Street, Vancouver, British Columbia (CA) V5P 3E8

(*) Notice: Subject to any disclaimer, the term of this patent is extended or adjusted under 35 U.S.C. 154(b) by 414 days.

(21) Appl. No.: 11/125,224

(22) Filed: May 10, 2005

(65) Prior Publication Data

US 2005/0248893 A1 Nov. 10, 2005

Related U.S. Application Data

(60) Provisional application No. 60/569,264, filed on May 10, 2004.

(51) Int. Cl.
*H02H 19/14* (2006.01)

(52) U.S. Cl. .................................................... 307/115

(58) Field of Classification Search ................. 307/115
See application file for complete search history.

(56) References Cited

U.S. PATENT DOCUMENTS

| | | | |
|---|---|---|---|
| 3,453,402 | A | 7/1969 | Suber |
| 3,571,544 | A | 3/1971 | Sheehan |
| 3,598,162 | A | 8/1971 | Rosenthal, Jr. |
| 3,632,914 | A | 1/1972 | Osika |
| 3,678,229 | A | 7/1972 | Osika |
| 3,714,383 | A | 1/1973 | Leonard et al. |
| 3,816,677 | A | 6/1974 | Soltez |
| 3,906,176 | A | 9/1975 | Carlson |
| 3,914,563 | A | 10/1975 | Prior |
| 4,107,484 | A | 8/1978 | Petersen, III |
| 4,168,416 | A | 9/1979 | Josemans |
| 4,230,917 | A | 10/1980 | Osika |
| 4,359,615 | A | 11/1982 | Meyerhoefer et al. |
| 4,463,228 | A | 7/1984 | Osika |
| 4,472,952 | A | 9/1984 | Hollowell, Jr. |
| 4,664,420 | A | 5/1987 | Demeri |
| 4,705,920 | A | 11/1987 | Sahrbacker |
| 4,865,557 | A | 9/1989 | Kershaw |
| 5,085,043 | A | 2/1992 | Hess et al. |
| 5,190,466 | A | 3/1993 | McVey |
| 5,320,187 | A | 6/1994 | Pressley et al. |
| 5,374,085 | A | 12/1994 | Beatrice et al. |
| 5,463,196 | A | 10/1995 | Darimont |

(Continued)

FOREIGN PATENT DOCUMENTS

| | | |
|---|---|---|
| CA | 2283552 | 3/2001 |

(Continued)

*Primary Examiner*—Robert L. DeBeradinis
(74) *Attorney, Agent, or Firm*—Antony C. Edwards

(57) ABSTRACT

A lockdown device for a power tool includes a housing containing a battery, a processor, and a relay. The housing mounts to an aperture in a power tool so as to be locked thereto and so as to be immovable therefrom without dismantling of the power tool. An electrical power cord mounts to the housing in electrical communication with the processor and relay. The processor communicates with the relay for selectively electrically opening and closing the relay upon instructions from the processor. The processor detects a mains electrical power supply and sequences opening of the relay following a pre-set delay upon detection by the processor of an absence of, or loss of the mains electrical supply to the processor and the relay. A removable key cooperates with the processor and relay for the manual closing of the relay to power the power tool.

8 Claims, 8 Drawing Sheets

U.S. PATENT DOCUMENTS

| | | | |
|---|---|---|---|
| 5,488,207 | A | 1/1996 | Niwa et al. |
| 5,510,587 | A | 4/1996 | Reiter |
| 5,563,586 | A | 10/1996 | Baum et al. |
| 5,675,997 | A | 10/1997 | Hulak |
| 5,736,837 | A | 4/1998 | Noda |
| 5,990,429 | A | 11/1999 | Kramer |
| 6,005,489 | A | 12/1999 | Siegle et al. |
| 6,012,941 | A | 1/2000 | Burdenko et al. |
| 6,049,045 | A | 4/2000 | Becker et al. |
| 6,461,176 | B1 | 10/2002 | Haas |
| 6,469,615 | B1 | 10/2002 | Kady et al. |
| 6,706,988 | B1 | 3/2004 | Helf et al. |
| 2003/0015007 | A1 | 1/2003 | Zapushek et al. |
| 2003/0062250 | A1 | 4/2003 | Kraenzler et al. |
| 2003/0136652 | A1 | 7/2003 | Bascom et al. |
| 2004/0020670 | A1 | 2/2004 | Kusmierski et al. |
| 2005/0035659 | A1 | 2/2005 | Hahn et al. |

FOREIGN PATENT DOCUMENTS

| | | | |
|---|---|---|---|
| DE | 10029138 | | 1/2002 |
| DE | 10125012 | | 11/2002 |
| EP | 0674973 | A1 | 10/1995 |
| FR | 2595532 | | 9/1987 |
| GB | 2 048 570 | | 12/1980 |
| GB | 2 353 323 | | 2/2001 |
| GB | 2 358 821 | | 8/2001 |
| WO | WO 97/10740 | | 3/1997 |

POWER TOOL LOCKDOWN DEVICE

CROSS REFERENCE TO RELATED APPLICATION

This application claims priority from U.S. Provisional Patent Application No. 60/569,264 filed May 10, 2004 entitled Power Tool Lock.

FIELD OF THE INVENTION

The invention relates to a lock for power tools, and more specifically to a locking device which may be integrated into a power tool to thereby prevent theft or unauthorized use of the power tool.

BACKGROUND OF THE INVENTION

In the construction industry and more generally in respect of powered tools and equipment, such as a powered drill or a powered saw, it is desirable to prevent accidental or unauthorized operation of the tools and equipment. Further, it is desirable to prevent or inhibit theft of such tools and equipment, which is a known problem in the construction industry where inefficiencies result if workers must constantly gather and lock up their tools and equipment in a safe storage location whenever a construction site is left unattended.

Applicant is aware of various means in the prior art which preclude unauthorized or accidental operation of a power tool. For example, there exists in the prior art electronic systems for control of power tools involving secret codes, where numeric codes are used in such devices rather than a mechanical key. The difficulty with such prior art mechanisms is that they are generally complex and intricate, and thus expensive to manufacture and incorporate into a power tool. Further, the electrical switch within a power tool is generally located within the power tool casing, making prior art devices that interact with the electrical switch difficult to install given space constraints.

It is therefore an object of the current invention to provide a means to disable a power tool and dissuade theft without resorting to locking the tool in a toolbox or other locked location, or running cables or chains combined with padlocks in and around the power tool. With the present invention, it is possible to have a locking mechanism permanently attached to the power tool that will not obstruct its use hence providing the opportunity to lock the tool at any time.

It is a further object of the present invention to provide for a locking device integral to the power cord of the power tool, rather than the electrical switch within the power tool.

It is a still further object of the present invention to provide an economical means to render a power tool inoperable and whose simplicity is such that it may attached to power tools as a retro-fit after-market addition by the user rather than needing to be incorporated into the power tool during manufacturing.

It is still a further object of the present invention to provide a locking device for a power tool that is designed to automatically render the tool inoperable after the expiry of a preset time period.

A further object of the present invention is to provide a built in safety feature, that unlike prior art, requires a separate key to be placed into the lock and turned in order to operate the electric tool, wherein, in a preferred embodiment, the key may then be removed once turned while still leaving the tool operable so long as plugged into a mains power supply. Prior art of which applicant is aware includes Canadian Patent No. 2,283,552 which issued Oct. 3, 2001 to St. Pierre for an Activation Code and Ownership Identification System for Power Tools, PCT Application No. PCT/GB00/03939 Internationally Filed Oct. 12, 2000 to Prizeman for Controlling Electrical Machines, DE Patent No. 100 29 138 issued Jan. 3, 2002 to Ferdinand for Locking Device for Prevention of Use of Hand-Tool Equipment, includes Electronic Lock Containing a Secret Code, EP Patent No. 0 674 973 published Oct. 14, 1995 for an Electric Tool with a Coding Means for its Activation, GB Patent No. 2 353 323 published Feb. 21, 2001 to Turnball for Access Control to Electrical Machines, GB Patent No. 2 405 559 published Mar. 3, 2005 to U.S. Patent Application Publication No. 2003/0062250 published Apr. 3, 2003 to Kraenzler et al. for an Electric Hand Power Tool with Switching Key, U.S. Patent Application Publication No. 2003/0136652 published Jul. 24, 2003 to Bascom et al. for Lockout Mechanism for Power Tool, U.S. Patent Application Publication No. 2004/0020670 published Feb. 5, 2004 to Kusmierski et al. for Switch Lock-off Mechanism for Power Tools, U.S. Patent Application Publication No. 2005/0035659 published Feb. 17, 2005 to Hahn et al. for Electronic Key for an Electrical Apparatus and Electrical Apparatus with Receiver for an Enabling Signal, U.S. Pat. No. 3,571,544 issued Mar. 23, 1971 to Sheehan for Magnetic Key Operated Switch for Electrically Operated Hand Tools, U.S. Pat. No. 3,632,914 issued Jan. 4, 1972 to Osika for Key-Operated Electrical Switch, U.S. Pat. No. 4,359,615 issued Nov. 16, 1982 to Meyerhoefer et al. for Switch and Means to Prevent Unauthorized Operation Thereof, and U.S. Pat. No. 5,736,837 issued Apr. 7, 1998 to Noda for Battery Charging Device for Battery Driven Tool.

The prior art generally teaches the use of a second button, keypad or lever that must be operated or engaged prior to the tools main switch for the power tool to operate. This prior art method works well when an authorized user is working the electric tool, however fails to completely stop an unauthorized user such as a child from working out how to start the electric tool, for example by observing the keypad code entered by the authorized user. With the lockdown device installed and in the off, that is, disabling position, the electric tool is unable to be operated even though the electric tool is in the possession of the unauthorized user. Unlike in the prior art, electric tools accessible to unauthorized users such as children may be made inoperable by use of the present invention and thus cause little threat, the present invention may be retro-fit to existing power tools, and render them both inoperable and difficult to tamper with to remove the present invention without damaging the tool, thereby rendering the tool unattractive to a would-be thief.

SUMMARY OF THE INVENTION

According to one aspect of the present invention, a method and apparatus is provided for the owners of electric tools to be able to disable, and then when required, reactivate an electric tool. The present invention renders the power tool inoperable to an unauthorized user. This creates a deterrent for would-be thieves, as they are unable to use and/or sell a power tool that will not work, and the tool will not work unless the apparatus according to the present invention is disengaged.

The lock in the preferred version of the invention comprises a key operated locking device, hereinafter referred to as a lockdown device, installed on the electric tool at the location wherein the AC power cord is attached. Once attached, the lockdown device provides a highly visible locking apparatus that, when engaged so as to interrupt the mains power supply to the tool renders the tool inoperable. This eliminates unauthorized use of the electric tool and at the same time makes the tool useless to thieves trying to use or re-sell the tool. As a result of the present invention, it is now possible to lock up each individual electric tool.

With the use of the present invention, unlike the prior art, it is possible to have a locking mechanism permanently attached to the electric tool that will not inhibit or interfere with the tool's use, hence providing the opportunity to lock up the tool at any time.

In summary, the power tool lockdown device according to one aspect of the present invention may be characterized as including a relay housing having first and second ends, the relay housing having an electrical relay mounted in the housing. The relay has an electrical input side and an electrical output side. In one embodiment, a mounting means such as a collar is mounted to the first end of the housing so as to extend therefrom. The mounting means is adapted for mounting into an aperture in a power tool so as to be locked thereto and so as to be immovable therefrom without dismantling of the power tool. Means are provided for inhibiting the dismantling of the power tool once the lockdown device is installed in the tool, for example, one-way screws which allow assembly of the tool but not disassembly. An electrical power cord receptacle is formed in the second end of the housing for mounting, in electrical communication, a power cord to the input side of the relay. An electrical conductor is mounted to the output side of the relay for electrical connection to a power switch of the power tool.

A processor is mounted in the housing. The processor communicates with the relay for selectively electrically opening and closing the relay upon instructions from the processor. The processor includes means for detecting a mains electrical power supply when the power cord is mounted to the power cord receptacle and when the power cord is connected to a mains electrical power supply. The processor further includes means for sequencing opening of the relay following a pre-set delay by a delay means upon detection by the processor of loss of the mains electrical supply. The delay means may be a count-down timer or otherwise a counter in the processor.

An externally accessible activating means, such as a key-operated lock or latch, is provided on the housing for selective closing of the relay by a user upon provision by the user of a key cooperative with the activating means, wherein the key may be physically removed from the activating means, once the relay is activated into the closed position, without opening the relay.

The power cord receptacle may be an end cap selectively demountable from the housing, wherein the end cap has an aperture therein sized for accepting one end of the power cord therethrough for electrical connection of the power cord to the input side of the relay.

The processor may include an independent power supply for supplying power to the processor and the relay upon disconnection from the mains electrical supply. The independent power supply may be a rechargeable battery which is automatically recharged from the mains electrical power supply.

DETAILED DESCRIPTION OF EMBODIMENTS OF THE INVENTION

Figure 1:
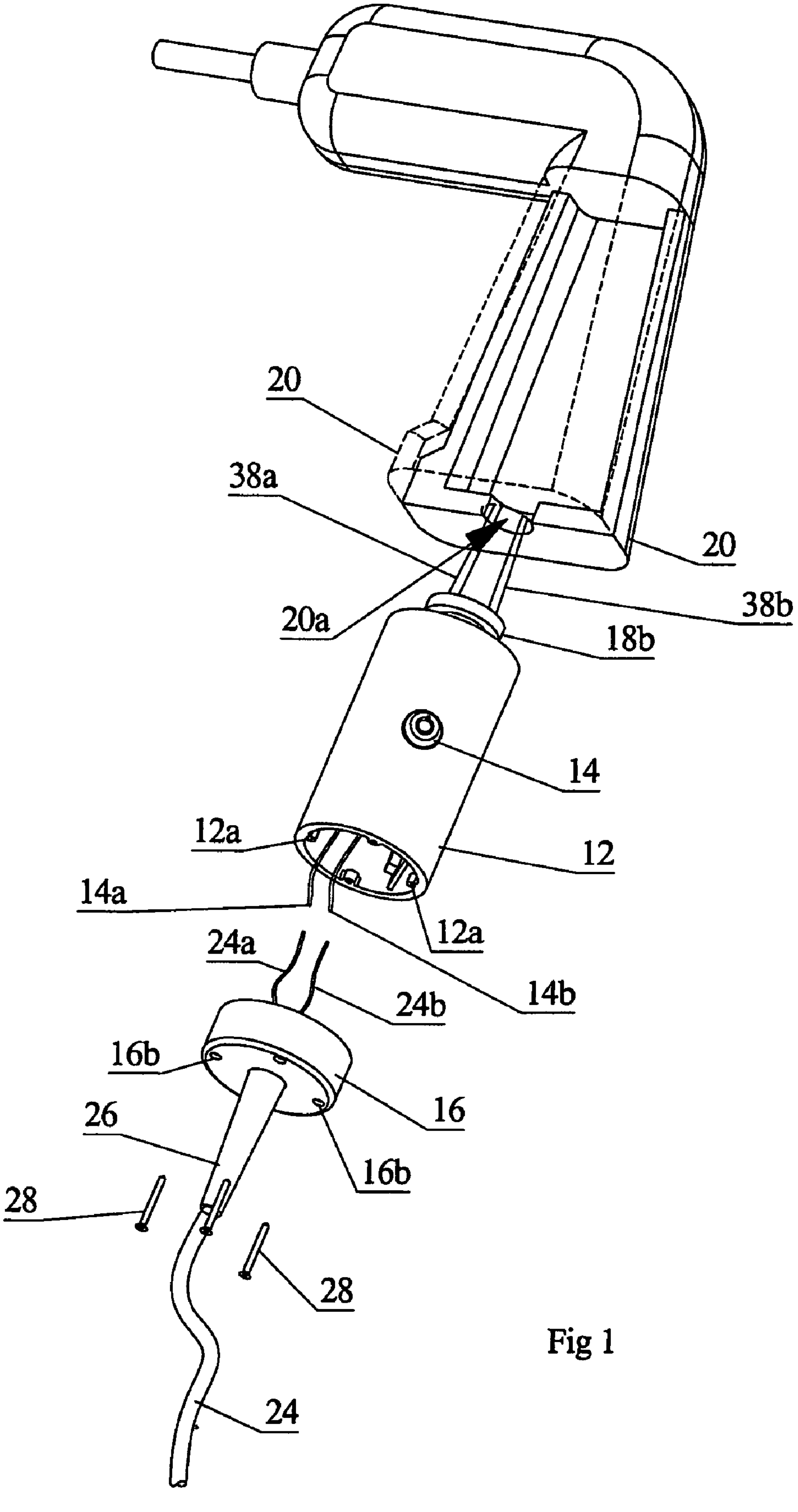
FIG. 1 is, in partially exploded perspective view, the power tool lockdown device according to the present invention being mounted to a conventional power tool.
Figure 2:
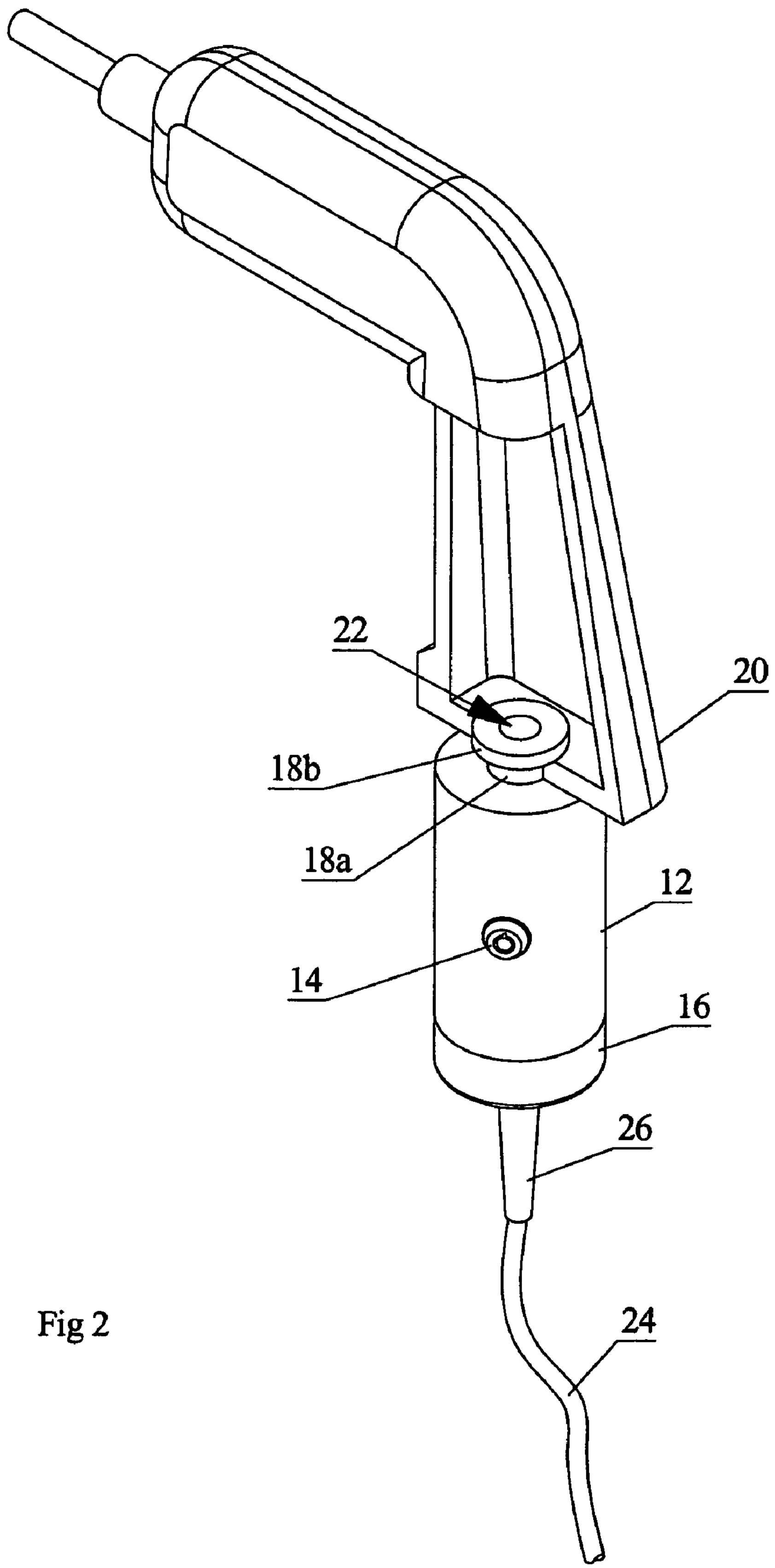
FIG. 2 is, in perspective view, the power tool lockdown device of FIG. 1, mounted to the handle of the power tool, with the power tool partially cut away.
Figure 3:
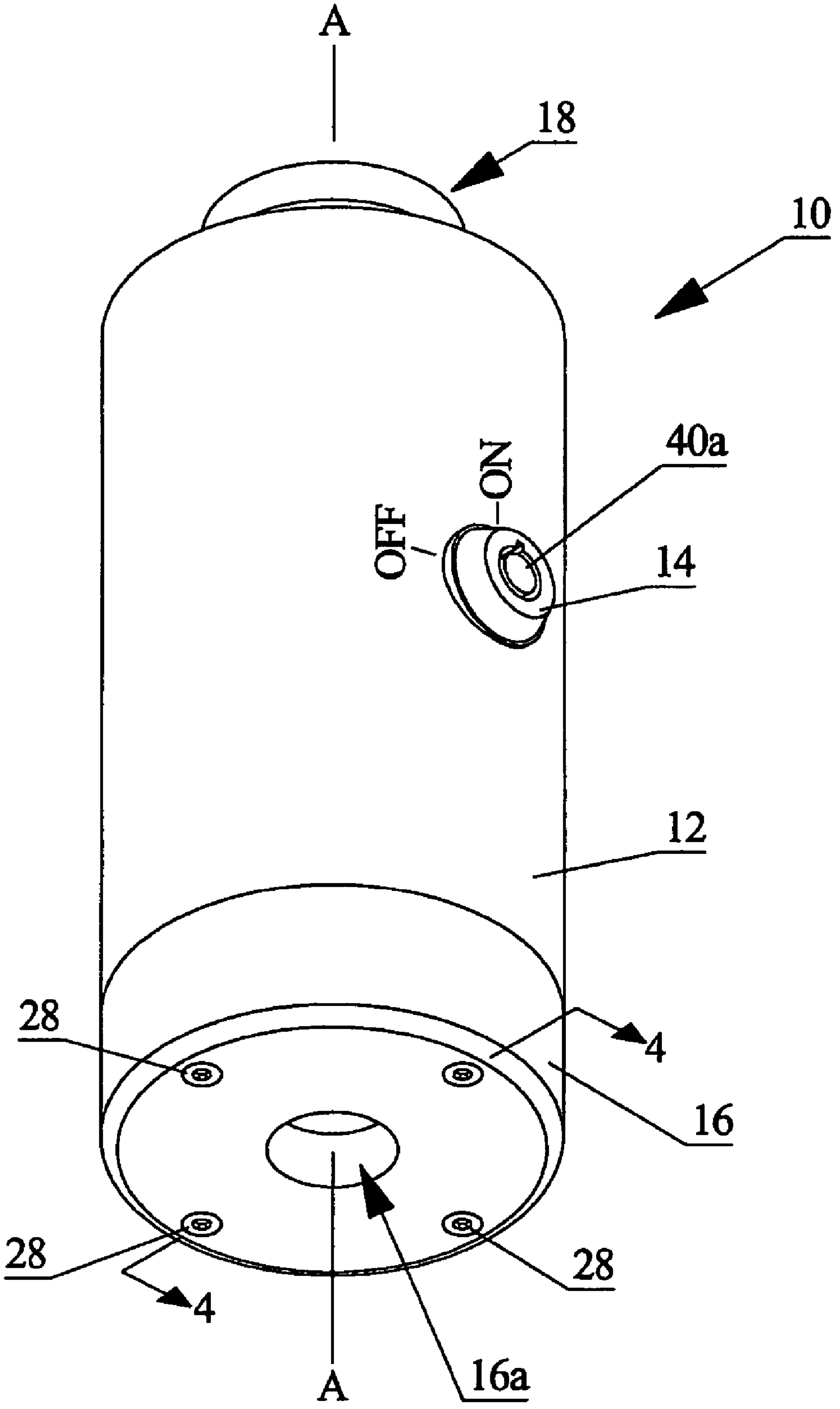
FIG. 3 is, in perspective view, the power tool lockdown device of FIG. 2 with the power cord removed.
Figure 4:
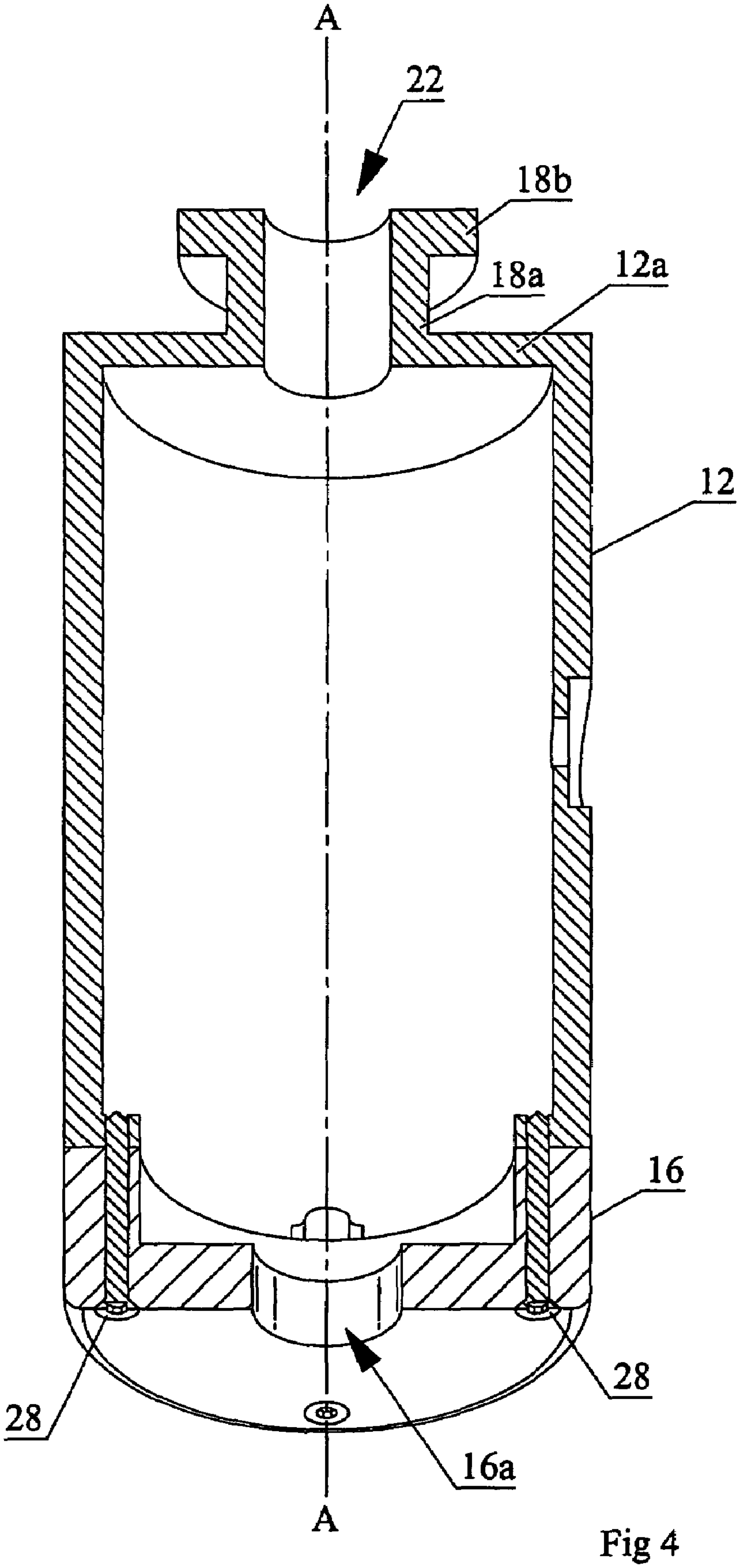
FIG. 4 is a cross sectional view along line 44 in FIG. 3 of the primary housing and end cap.
Figure 5:
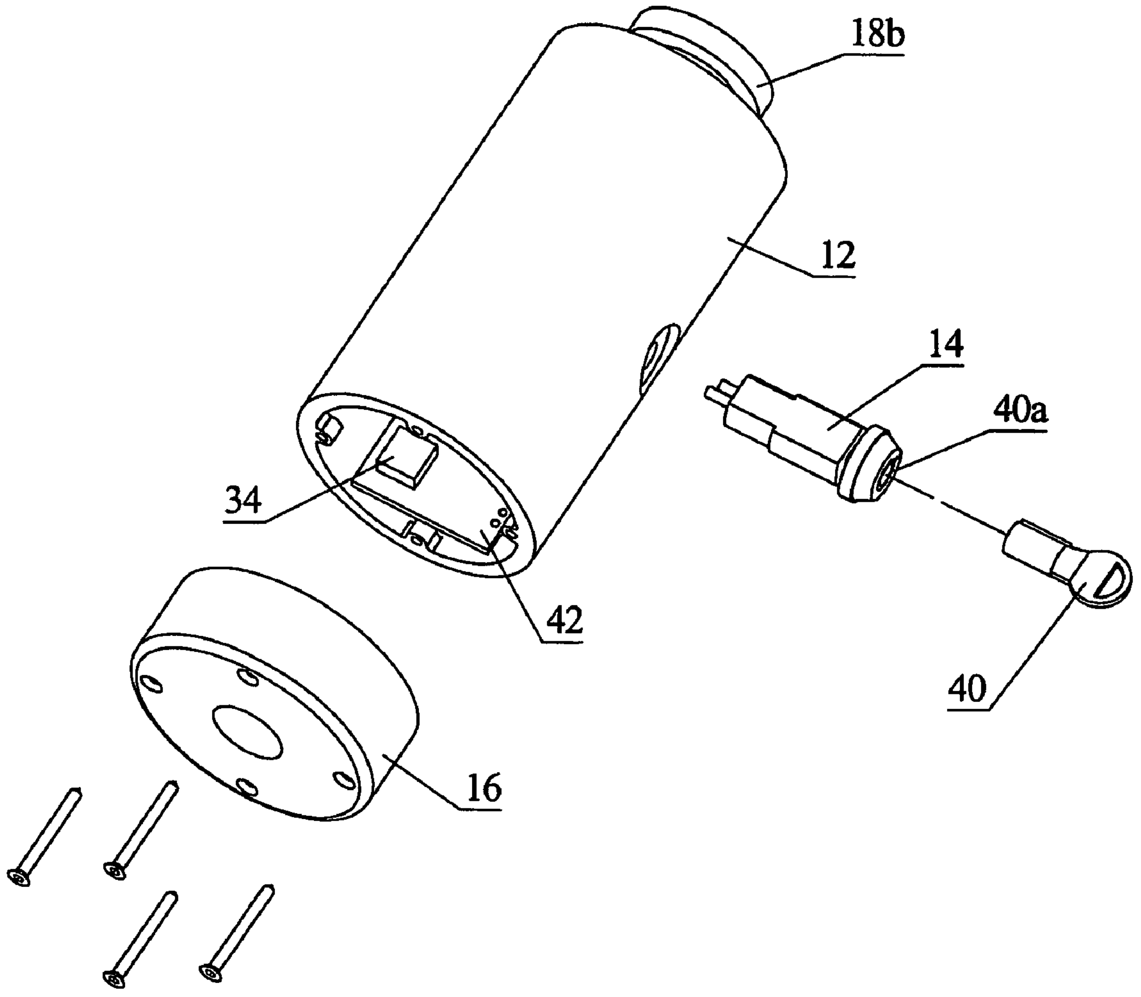
FIG. 5 is, in partially exploded view, the power tool lockdown device of FIG. 3.
Figure 6:
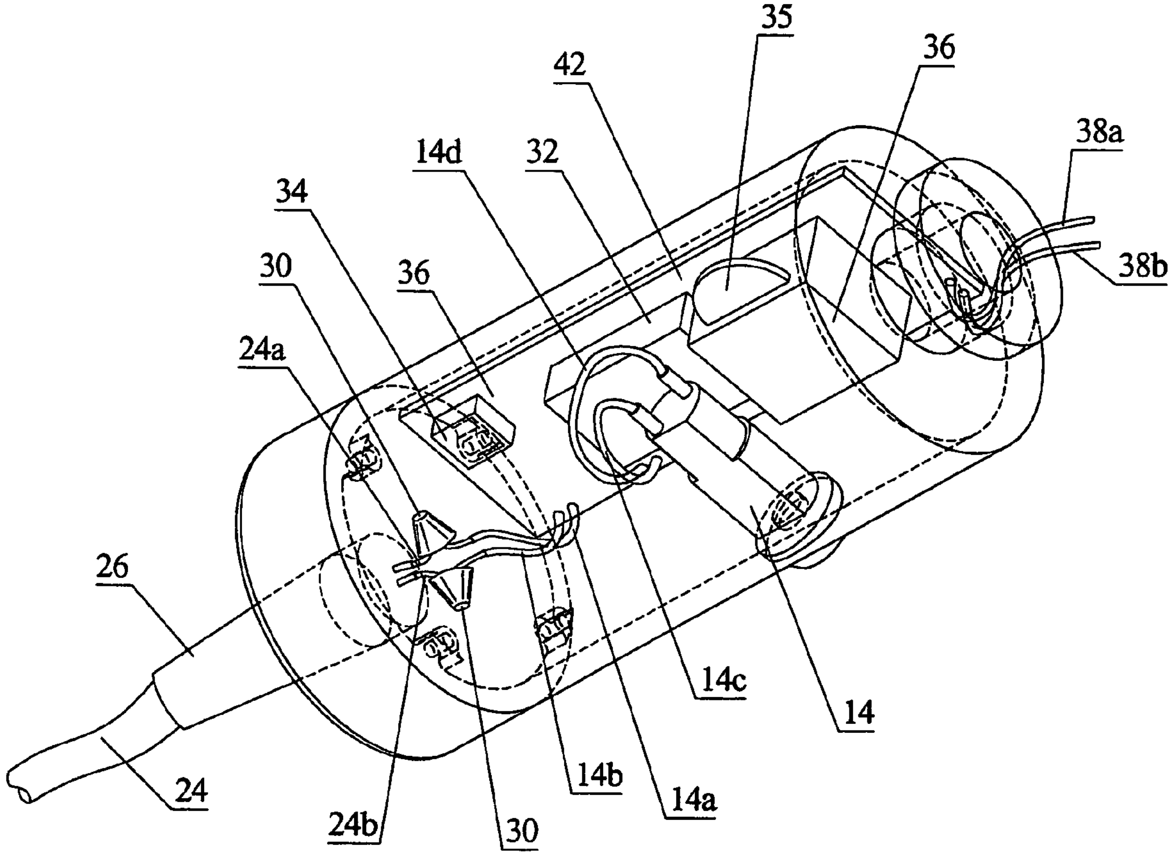
FIG. 6 is, in partially cut away assembled view, the power tool lockdown device of FIG. 1.
Figure 7:
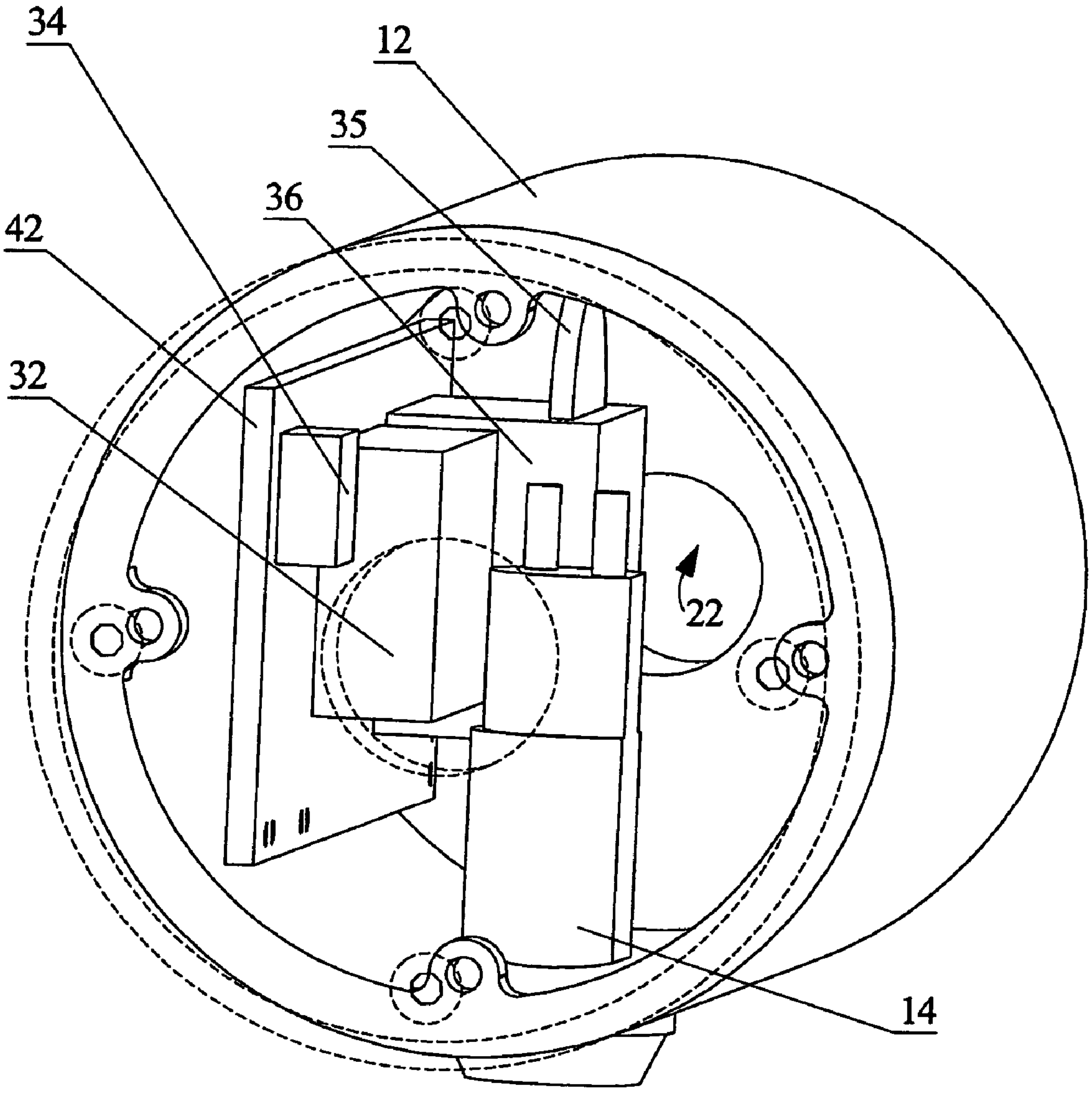
FIG. 7 is, in partially cut away end-on perspective view, the power tool lockdown device of FIG. 3.

With reference to the drawings wherein similar characters of reference denote corresponding parts in each view, lockdown device 10 includes a primary housing 12, a relay unit 14 mounted in the primary housing, a power-cord receiving end cap 16 mounted at one end of the primary housing 12, and a means 18, at the other end of the primary housing 12, for rigidly mounting primary housing 12 to the casing 20 of a power tool such as that shown in FIG. 1.

In the illustrated embodiment, which is not intended to limiting, the means 18 for rigidly mounting primary housing 12 to power tool casing 20, includes a rigid neck **18*a* extending rigidly from first end 12' of primary housing 12, neck 18*a* supporting at, and around, the distal end thereof an annular collar 18*b*, wherein neck 18*a* and collar 18*b* define a cylindrical opening 22. Due to variations in power tool configuration neck 18*a* and collar 18*b*** may be co-axial or be offset to one side of axis A-A.

A convention non-battery operated power tool, such as the drill illustrated in FIG. 1, will require a power cord 24 for electrically connecting the power tool to a mains electrical supply. It is common for the power cord 24 for the power tool to have a resilient frusto-conically shaped hollow cord protector 26 which mounts into a correspondingly shaped and sized aperture **20*a* formed in the power tool when the two opposed facing casings 20 are mounted to one another when the power tool is assembled. In the illustrated embodiment, which, again, is not intended to be limiting, primary housing 12 mates to, and between, opposed facing casings 20 by snugly mating neck 18*a* into aperture 20*a* so as to dispose collar 18*b* against the interior surface of casings 20 adjacent aperture 20*a*. Collar shape can vary and will have some configuration that will lock the mating neck 18*a* against casing 20 and 20*a* so the lock cannot spin about the power tool. Thus with neck 18*a* firmly sandwiched in aperture 20*a* between opposed facing casings 20, primary housing 12 forms a rigid extension of the power tool, with the housing interspersed between the power tool and power cord 24. Power cord protector 26 conformably mates into aperture 16*a* in end cap 16 so that, with power cord 24 journalled through power cord protector 26, the positive and negative electrically conductive wires 24*a* and 24*b* may be exposed so as to extend into primary housing 12 when end cap 16 is mounted onto primary housing 12. End cap 16 may be so mounted for example be means of screws or bolts 28 journalled through corresponding apertures 16***b* in end cap 16 so as to threadably engage correspondingly threaded apertures 12*a* in primary housing 12.

Figure 8:
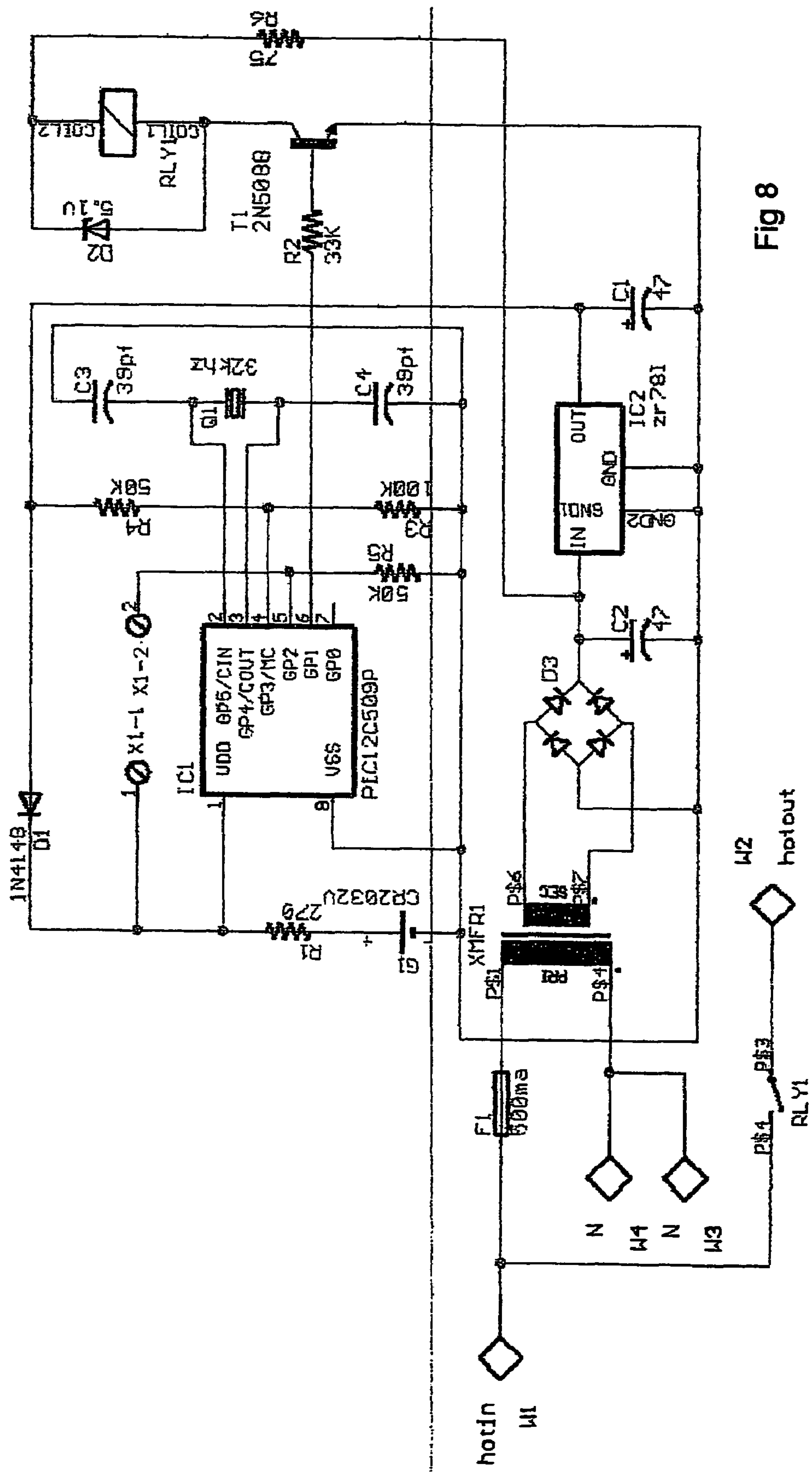
FIG. 8 is an electrical schematic diagram of one embodiment of the power tool lockdown device according to the present invention.

Wires 24*a* and 24*b* from power cord 24 are electrically connected, for example by conventional twist-on wire connectors 30 or other electrical fasteners for joining connecting wires 24*a* and 24*b* to electrical leads 14*a* and 14*b* so as to electrically connect to a processor 34 and relay unit 38. Power conditioner 36 may contain a transformer XMFR1 as seen in FIG. 8. Processor 34 is powered by battery 35 (battery G1 in FIG. 8) which is recharged by mains power via power conditioner 36. Power leads 38*a* and 38*b* supply power to the power tool's main power switch and thereby to the motor of the power tool via cylindrical opening 22 in neck 18*a*. When power cord 24 is plugged into a live mains electrical supply, electrical power is provided to the input side of relay 32 via lead 14*c*. When key 40 is inserted into switch 14 via key port 40*a*, and key 40 turned to the "on" position relay RLY1 as seen in the electrical schematic diagram of FIG. 8, is closed so as to supply power to the tool via lead 14*d*. Once key 40 has been turned to the "on" position so as to supply mains power to the power tool, the key may be returned to the "off" position and removed from key port 40*a* for safe keeping by a user. Processor 34, as described in further detail below, monitors for continued mains power supply and at such time as mains power supply is disconnected, for example by power cord 24 being removed from a wall socket, processor 34 commences a pre-set timed countdown at the end of which the contacts within relay unit are opened thereby cutting off power supply to the power tool and disabling the power tool until key 40 is once again inserted into key port 40*a* and cycled through an "off" and "on" position rotation of the key.

Processor 34, power conditioner 36, and battery 35, may be mounted within primary housing 12 on a circuit board or other rigid substrate 42. All of the electrical components may be protected by a flame resistant compound (not shown) which fills the entire outer casing 12.

One of the objectives of the present invention is to provide for a retro-fit of lockdown device 10 to existing electrically powered tools. For example, to attach the lockdown device to the electric tool the following procedure may be followed: the existing power cord is first detached from the electric tool and attached to the lockdown device. The existing screws which hold the plastic housing of an electric tool together are removed exposing the AC power cord and electric tool switch. The wires leading to the electric tool switch are removed and any strain relief device is undone to allow the AC power cord to be removed from the electric tool. The AC power cord is then severed ahead of the cord protector. The end cap is removed from the back section of the lockdown device housing. The cord protector is removed and mounted in the end cap through the opening in the end cap. A bracket (not shown) may be employed to clamp the cord to the end cap. The AC power cord is stripped to expose the internal wires which are then inserted through cord protector. The bracket clamps the wires in place. Twist-on wire connectors are used to connect the power cord wires to the wires from the relay unit. The end cap is replaced back onto the lockdown device housing.

The wires that were removed from the electric tool switch are now reattached to the switch and the opposite ends of these wires stripped. Bullet crimps may be attached to these wires. The wires from the housing are attached with mating bullet crimps and inserted into the wires coming from the electric tool's switch. The neck of housing is placed in the aperture in the tool where the cord protector was originally removed from. The tools strain relief is placed over the neck and tightened. The tool housing halves are placed back together using security that is one-way screws which are not easily removed once installed. The security screws inhibit later dismantling of the tool's housing thus inhibiting the removal of the neck from the tool housing without severely damaging the housing.

To provide power to pass to the tool, the key is inserted into key chamber of the relay unit for safe storage and turned to the "on" position, then immediately back to the "off" position and the key removed. The lockdown device is now activated and the user has a preset number of hours to plug in the electric tool and begin use. So long as plugged into a power source such as mains power within that preset period of time. As long as the electric tool remains plugged in to the power source the electric tool can be used as normal. If the electric tool is unplugged for a period greater than a second preset time period (which may be the same amount of time as the first pre-set time period), the lockdown device will de-activate automatically and power will be cut off from the tool.

Referring now to the electrical schematic diagram of FIG. 8, the circuit operates on 3Vdc (nominal) which is obtained from either the battery G1 or from power obtained by a standard linear power supply of the 120Vac line voltage. When plugged into 120Vac, the available power on the 3Vdc line both operates the microcontroller IC1 and charges the battery G1. The device is controlled by a 8 pin PIC12F629 microcontroller IC1 operating at 32 kHz. When the key is turned to the "on" and then back to the "off " position, the microcontroller IC1 detects this and activates an internal flag in its memory, and initializes a down counter. This counter is decremented once every minute until it reaches zero, at which point the flag which was activated is then cleared. While this "active" flag is set, the software in IC1 will detect if the tool is then cleared. If it is it will reset the counter to full, allowing a fixed period of time after being unplugged until deactivation. Also while plugged in and activated the software will turn on the relay (RLY1), allowing the connected tool to operate as normal.

What follows is a description of the elements represented in the electrical schematic diagram of FIG. 8:

| | |
|---|---|
| F1 | fuse 500 ma slow blow Proves protection for control circuit |
| XMFR1 | Transformer 120 Vac input, 6 Vac output Steps down AC line voltage for use in control circuitry |
| D3 | Bridge rectifier diode(s) rectifies 6 Vac from XMFR1 to a DC waveform |
| C2 | Filter capacitor, 63 uF filters out rectified waveform from D3 into a low ripple DC voltage |
| IC2 | 3.3 volt dc regulator, takes filtered DC voltage from C2 and regulates it to 3.3 Vdc |

-continued

| | |
|---|---|
| C1 | filter capacitor, 63 uF, provides a filter for the 3.3 Vdc supply |
| D1 | Diode, 1N4148, performs two functions. It keeps voltage to battery to an acceptable 3.0-3.1 volt maximum, allows microcontroller to detect if device is plugged into AC. |
| R1 | Resistor, 270 ohm, Limits charging and discharging current to battery |
| G1 | battery, lithium rechargeable, stores power for microcontroller to function on when device is not plugged in. |
| IC1 | Microcontroller, PIC12F629, contains software that operates the device |
| R5 | resistor, 50K ohm, pull-down resistor for key switch |
| X1 | solder pads for key switch, key switch pulls pin 5 of IC1 high when activated. |
| R3 | resistor, 100K ohm, see R4 for description |
| R4 | resistor, 50K, together with R3, provide a logic level high to IC1 when device is plugged into AC. These form a resistor divider to ensure that the input to IC1 does not go over the maximum voltage allowed on its input pin |
| C4, C3 | Capacitors, 33 pF, caps for crystal oscillator |
| Q1 | Crystal oscillator, provides clock for IC1. |
| R2 | Resistor, base resistor for T1, sets base current into T1 |
| T1 | Transistor, 2N5088, turns on relay (RLY1) while using minimal current from IC1, also allows IC1 to turn on relay, as they operate at different voltages. |
| D2 | Zener diode, 5.1 V, protects coil of relay (RLY1) from being exposed to an over voltage. |
| R6 | resistor, 75 ohm, limits current to relay coil (RLY1) and D2 |
| RLY1 | Relay, 5 V coil, 15 Amp contacts (resistive), connects or interrupts current to tool connected to this circuit. |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A lockdown device for a power tool comprising:

a relay housing having first and second ends, an electrical relay mounted in said housing, said relay having an electrical input side and an electrical output side, a mounting means mounted to said first end of said housing so as to extend therefrom, said mounting means adapted for mounting into an aperture in a power tool so as to be locked thereto and so as to be immovable therefrom without dismantling of the power tool, an electrical power cord receptacle formed in said second end of said housing for mounting, in electrical communication, a power cord to said input side of said relay, an electrical conductor mounted to said output side of said relay for electrical connection to a power switch of the power tool, a processor mounted in said housing and communicating with said relay for selectively electrically opening and closing said relay upon instructions from said processor, said processor including means for detecting a mains electrical power supply when the power cord is mounted to said power cord receptacle and when the power cord is connected to a mains electrical power supply, said processor further comprising means for sequencing opening of said relay following a pre-set delay by a delay means upon detection by said processor of an absence of, or loss of the mains electrical supply to said processor and said relay, an externally accessible activating means on said housing for selective closing of said relay by a user upon provision by the user of a key cooperative with said activating means, wherein said key may be physically removed from said activating means, once said relay is activated into said closed position, without opening said relay.

2. The device of claim 1 wherein said power cord receptacle is an end cap selectively demountable from said housing, wherein said end cap has an aperture therein sized for accepting one end of the power cord therethrough for electrical connection of the power cord to said input side of said relay.

3. The device of claim 1 wherein said processor includes an independent power supply for supplying power to said processor and said relay upon disconnection from the mains electrical supply.

4. The device of claim 3 wherein said independent power supply is automatically rechargeable from said mains electrical power supply when connected.

5. The device of claim 1 wherein said mounting means is a rigid collar.

6. The device of claim 1 wherein said delay means is a counter in said processor.

7. The device of claim 1 further comprising non-removable power tool casing fasteners for clamping a casing of the power tool irremovably about said mounting means.

8. The device of claim 1 wherein said mounting means is adapted to snugly mount in a power cord aperture of a casing of the power tool.

* * * * *